US012577826B2

(12) United States Patent
Laserra Lima et al.

(10) Patent No.: US 12,577,826 B2
(45) Date of Patent: Mar. 17, 2026

(54) POWER DOOR TIP TO CLOSE

(71) Applicant: GM Global Technology Operations LLC, Detroit, MI (US)

(72) Inventors: Thiago Laserra Lima, Sterling Heights, MI (US); Sitaram Emani, Novi, MI (US); Carlos S. Jabbour, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 18/782,614

(22) Filed: Jul. 24, 2024

(65) Prior Publication Data

US 2026/0028869 A1 Jan. 29, 2026

(51) Int. Cl.
*E05F 15/75* (2015.01)
*E05F 15/41* (2015.01)
*E05F 15/70* (2015.01)

(52) U.S. Cl.
CPC .............. *E05F 15/75* (2015.01); *E05F 15/41* (2015.01); *E05F 15/70* (2015.01); *E05Y 2400/37* (2024.05); *E05Y 2400/40* (2013.01); *E05Y 2900/531* (2013.01)

(58) Field of Classification Search
None
See application file for complete search history.

(56) References Cited

U.S. PATENT DOCUMENTS 7,070,226 B2 * 7/2006 Cleland ................. F16F 9/0245 49/339
8,405,337 B2 * 3/2013 Gebhart .................. E05F 15/63 49/506
10,132,112 B2 * 11/2018 Yu ........................... E05F 15/76
10,344,519 B2 * 7/2019 Linden ..................... E05F 15/40
10,392,849 B2 * 8/2019 Xiao ...................... E05F 15/611
11,180,944 B2 * 11/2021 Herrmann ............. E05F 15/627
11,434,683 B2 * 9/2022 Sabatini .................. E05B 81/76
12,291,915 B2 * 5/2025 Paerschke ................. H02P 7/05
12,338,671 B2 * 6/2025 Zeabari ................. E05F 15/622
2013/0144495 A1 * 6/2013 Yu ........................... E05F 15/70 701/49
2019/0234129 A1 * 8/2019 Herrmann ............. E05F 15/611
2023/0258036 A1 * 8/2023 Paerschke ................. H02P 8/12 49/324
2023/0265704 A1 * 8/2023 Zeabari ................. E05F 15/622 74/89.38

FOREIGN PATENT DOCUMENTS

CN 102216550 A * 10/2011 ............ E05F 15/622
DE 102019121640 A1 8/2020
EP 4394156 A1 7/2024
KR 100488661 B1 * 5/2005 ........... E05C 17/203

* cited by examiner

*Primary Examiner* — Catherine A Kelly
(74) *Attorney, Agent, or Firm* — Vivacqua Crane, PLLC

(57) ABSTRACT

A powered door system for a vehicle includes a system controller that is adapted to detect when an operator initiates closing of a door that is being maintained in an open position, a motor in communication with the system controller and adapted to move the door from the open position to a closed position, the system controller further adapted to, upon detection that an operator has initiated closing of the door, maintain a powered closing speed of the door from the open position to a pinch point, slow the closing speed of the door when the door reaches the pinch point, and allow the door to freely move to a closed position.

20 Claims, 4 Drawing Sheets

POWER DOOR TIP TO CLOSE

INTRODUCTION

The present invention relates generally to a door for a vehicle that is powered to close. Specifically, once an operator initiates closing of the door, a motor moves the door from an open position to a closed position at a speed which mirrors the operator's intention.

Current powered vehicle doors simply provide powered movement from an open position to a closed position at a single pre-determined speed. Thus, while current powered vehicle doors achieve their intended purpose, there is a need for a new and improved system and method for providing powered closing of a vehicle door wherein the powered vehicle door mirrors the intentions of an operator regarding speed and force of closing the door, and provides interruption of the powered closing when the door approaches a closed position to provide for a soft closing of the powered vehicle door.

SUMMARY

According to several aspects of the present disclosure, a method of controlling a powered door closing in a vehicle includes maintaining a door of a vehicle in an open position, detecting, with a controller, initiation of closing of the door by an operator, maintaining, with the controller, a powered closing speed of the door from the open position to a pinch point, slowing the closing speed of the door when the door reaches the pinch point, and allowing the door to freely move to a closed position.

According to another aspect, the maintaining the door of the vehicle in the open position further includes passively holding the door in the open position at a pre-determined holding force with a passive holding mechanism, and the detecting, with the controller, initiation of closing of the door by an operator further includes monitoring, with the controller via communication with an accelerometer, an acceleration of the door, monitoring, with the controller via communication with a hall sensor, a position of the door, and determining, with the controller, that closing of the door has been initiated based on feedback, received by the controller from the accelerometer and the hall sensor, that the pre-determined holding force has been overcome and the door has moved from the open position.

According to another aspect, the maintaining, with the controller, a powered closing speed of the door from the open position to a pinch point further includes monitoring, with the controller via communication with the accelerometer, an acceleration of the door, monitoring, with the controller via communication with the hall sensor, a position of the door, calculating, based on feedback from the accelerometer and the hall sensor a closing speed at which the operator is moving the door from the open position toward the closed position, actuating, with the controller, a motor adapted to move the door from the open position to the closed position, and moving, with the motor, the door from the open position to the closed position at the calculated closing speed.

According to another aspect, the maintaining, with the controller, a powered closing speed of the door from the open position to a pinch point further includes continuously updating the calculated closing speed throughout movement of the door from the open position to the closed position, and stopping, with the controller, powered movement of the door with the motor when the controller, via feedback from the accelerometer, detects that the door has hit an obstacle between the open position and the closed position.

According to another aspect, the slowing the closing speed of the door when the door reaches the pinch point further includes determining, with the controller, based on feedback from the hall sensor, when the door reaches the pinch point, and at least one of braking movement of the door by reversing, with the controller, the motor, and braking movement of the door by actuating, with the controller, a braking mechanism adapted to impede movement of the door.

According to another aspect, the allowing the door to freely move to a closed position further includes detecting, with the controller via communication with the hall sensor, when the door reaches a closing position, and when the door reaches the closing position, deactivating the braking and allowing the door to freely move to the closed position.

According to another aspect, the maintaining the door of the vehicle in the open position further includes actively holding the door in the open position at a pre-determined holding force with a braking mechanism adapted to impede movement of the door, and the detecting, with the controller, initiation of closing of the door by an operator further includes monitoring, with the controller via communication with a torque sensor, a force applied by an operator to move the door from the open position toward the closed position, determining, with the controller, that closing of the door has been initiated based on feedback, received by the controller from the torque sensor, that the pre-determined holding force has been overcome, and deactivating the braking mechanism.

According to another aspect, the maintaining, with the controller, a powered closing speed of the door from the open position to a pinch point further includes monitoring, with the controller via communication with an accelerometer, an acceleration of the door, monitoring, with the controller via communication with a hall sensor, a position of the door, calculating, based on feedback from the accelerometer and the hall sensor a closing speed at which the operator is moving the door from the open position toward the closed position, actuating, with the controller, a motor adapted to move the door from the open position to the closed position, and moving, with the motor, the door from the open position to the closed position at the calculated closing speed.

According to another aspect, the maintaining, with the controller, a powered closing speed of the door from the open position to a pinch point further includes continuously updating the calculated closing speed throughout movement of the door from the open position to the closed position, and stopping, with the controller, powered movement of the door with the motor when the controller, via feedback from the accelerometer, detects that the door has hit an obstacle between the open position and the closed position.

According to another aspect, the slowing the closing speed of the door when the door reaches the pinch point further includes determining, with the controller, based on feedback from the hall sensor, when the door reaches the pinch point, and at least one of braking movement of the door by reversing, with the controller, the motor, and braking movement of the door by actuating, with the controller, the braking mechanism.

According to another aspect, the allowing the door to freely move to a closed position further includes detecting, with the controller via communication with the load sensor, when the force of the closing door falls below a predetermined braking threshold, and when the force of the closing door falls below the predetermined braking threshold, discontinuing braking of the door and allowing the door to freely move to the closed position.

According to several aspects of the present disclosure, a powered door system for a vehicle includes a controller that is adapted to detect when an operator initiates closing of a door that is being maintained in an open position, a motor in communication with the controller and adapted to move the door from the open position to a closed position, the controller further adapted to, upon detection that an operator has initiated closing of the door, maintain a powered closing speed of the door from the open position to a pinch point, slow the closing speed of the door when the door reaches the pinch point, and allow the door to freely move to a closed position.

According to another aspect, the door of the vehicle is passively maintained in the open position at a pre-determined holding force with a passive holding mechanism, and when detecting when an operator initiates closing of the door, the controller is further adapted to monitor acceleration of the door with an accelerometer, monitor a position of the door with a hall sensor, and determine that closing of the door has been initiated based on feedback from the accelerometer and the hall sensor that the pre-determined holding force has been overcome and the door has moved from the open position.

According to another aspect, when maintaining a powered closing speed of the door from the open position to the pinch point, the controller is further adapted to calculate, based on feedback from the accelerometer and the hall sensor, a closing speed at which the operator is moving the door from the open position toward the closed position, actuate the motor to move the door from the open position to the closed position, move, with the motor, the door from the open position to the closed position at the calculated closing speed, continuously update the calculated closing speed throughout movement of the door from the open position to the pinch point, and stop powered movement of the door with the motor when the controller, via feedback from the accelerometer, detects that the door has hit an obstacle between the open position and the closed position.

According to another aspect, when slowing the closing speed of the door when the door reaches the pinch point, the controller is further adapted to determine, based on feedback from the hall sensor, when the door reaches the pinch point, and at least one of brake movement of the door by reversing the motor, and brake movement of the door by actuating the braking mechanism.

According to another aspect, when allowing the door to freely move to the closed position the controller is further adapted to detect, via communication with the hall sensor, when the door reaches a closing position, and when the door reaches the closing position, deactivate the braking of the door and allow the door to freely move to the closed position.

According to another aspect, the door of the vehicle is actively maintained in the open position at a pre-determined holding force by a braking mechanism adapted to impede movement of the door, and when detecting initiation of closing of the door by an operator the controller is further adapted to monitor, via communication with a torque sensor, a force applied by an operator to move the door from the open position toward the closed position, determine that closing of the door has been initiated based on feedback, from the torque sensor, that the pre-determined holding force has been overcome, and deactivating the braking mechanism.

According to another aspect, when maintaining a powered closing speed of the door from the open position to the pinch point the controller is further adapted to monitor, with an accelerometer, an acceleration of the door, monitor, with a hall sensor, a position of the door, calculate, based on feedback from the accelerometer and the hall sensor a closing speed at which the operator is moving the door from the open position toward the closed position, actuate the motor to move the door from the open position to the closed position, move, with the motor, the door from the open position to the closed position at the calculated closing speed, continuously update the calculated closing speed throughout movement of the door from the open position to the closed position, and stop powered movement of the door with the motor when the controller, via feedback from the accelerometer, detects that the door has hit an obstacle between the open position and the closed position.

According to another aspect, when slowing the closing speed of the door when the door reaches the pinch point the controller is further adapted to determine, based on feedback from the hall sensor, when the door reaches the pinch point, and at least one of: brake movement of the door by reversing the motor, and brake movement of the door by actuating a brake adapted to impede movement of the door, and when allowing the door to freely move to the closed position, the controller is further adapted to detect, via communication with the load sensor, when the force of the closing door falls below a predetermined braking threshold, and, when the force of the closing door falls below the predetermined braking threshold, discontinue braking of the door and allow the door to freely move to the closed position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
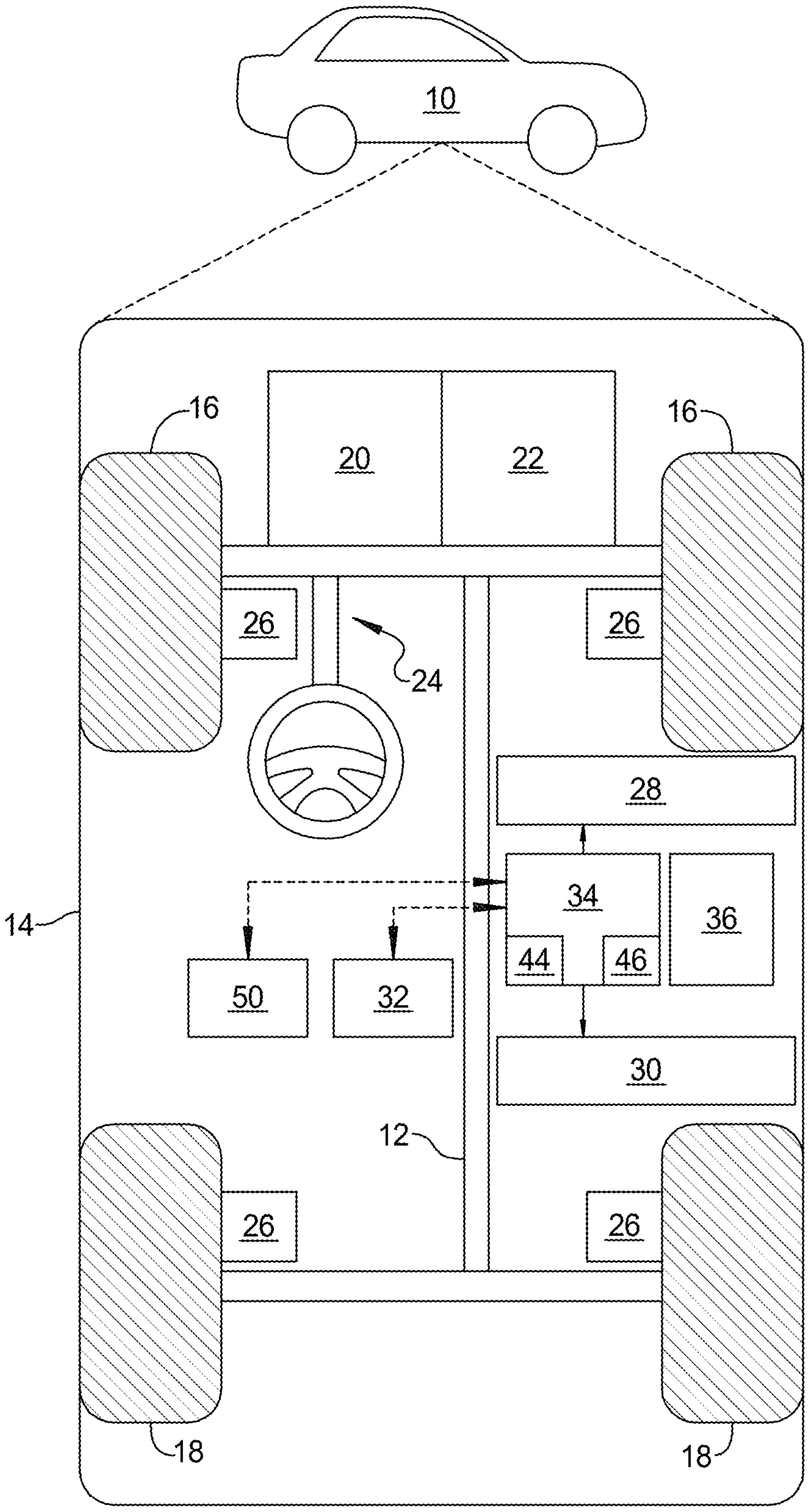
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated powered door system 50 for providing powered closure of a door 52 of the vehicle 10. In general, the system 50 works in conjunction with other systems within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
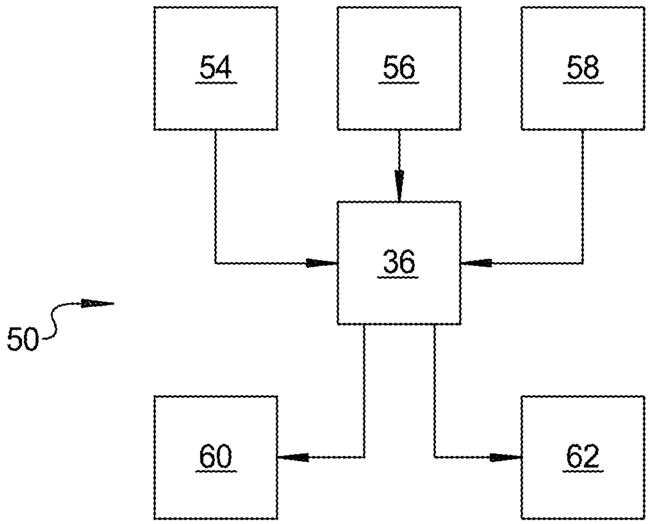
FIG. 2 is a schematic diagram of a powered door system according to an exemplary embodiment of the present disclosure.

Referring to FIG. 2 a schematic diagram of an exemplary embodiment of the powered door system 50 is shown. The powered door system 50 includes a system controller 36 in communication with an accelerometer 54 positioned within a door 52 of the vehicle 10 and adapted to provide information to the system controller 36 related to acceleration of the door 52, a hall sensor 56 adapted to provide information to the system controller 36 related to a position of the door 52, a torque sensor 58 adapted to provide information to the system controller 36 related forces applied to or by the door 52. In addition, the powered door system 50 includes a motor 60 in communication with the system controller 36 and adapted to receive instructions from the system controller 36 and provide powered closing of the door 52 in accordance with instructions received from the system controller 36, and a braking mechanism 62 adapted to impede movement of the door 52. The system controller 36 may be the vehicle controller 34, or the system controller 36 may be a separate controller in communication with the vehicle controller 34.

Figure 3:
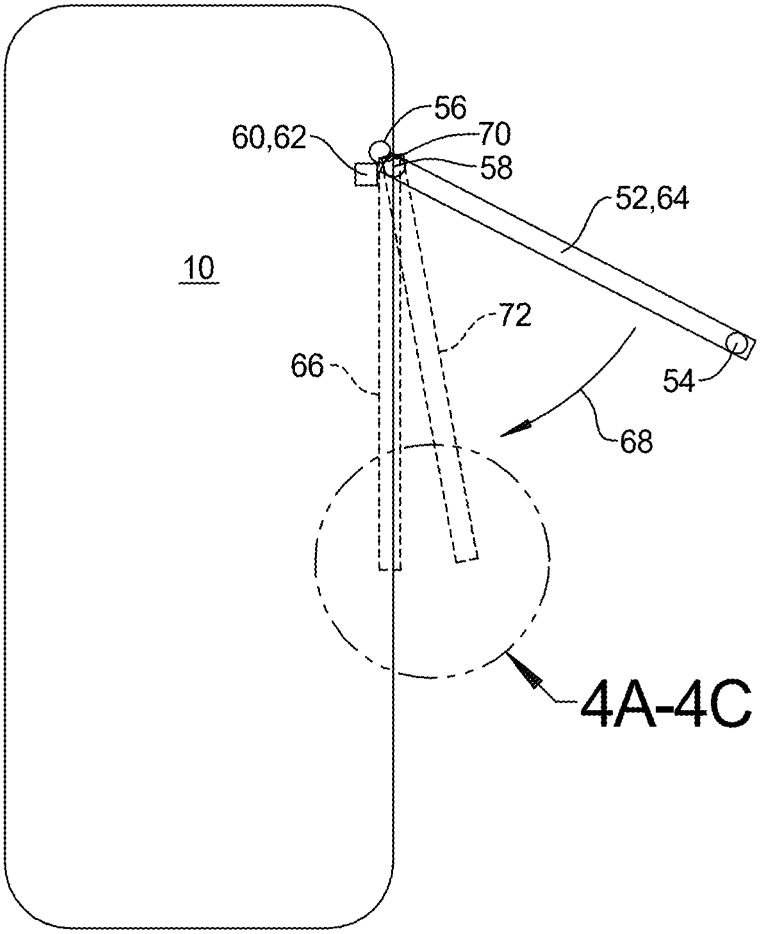
FIG. 3 is a schematic top view of the vehicle of FIG. 1 with a powered door system wherein the door is shown in various positions between and open position and a closed position.

In an exemplary embodiment, the system controller 36 is adapted to detect when an operator initiates closing of the door 52 that is being maintained in an open position at a pre-determined holding force. Referring to FIG. 3, the door 52 is pivotally moveable between an open position, as indicated at 64, and a closed position, as indicated at 66. When the door 52 is in the open position, the door 52 is either passively or actively held in the open position such that the door 52 will remain in the open position until closing of the door 52 is initiated by an operator/passenger of the vehicle 10. The system controller 36 detects initiation of closing of the door 52 upon movement of the door 52 from the open position toward the closed position, as indicated by arrow 68.

In an exemplary embodiment, the door 52 of the vehicle 10 is passively maintained in the open position at the pre-determined holding force with a passive holding mechanism 70. The passive holding mechanism 70 is designed to automatically hold the door 52 at the open position at the pre-determined holding force when the door 52 is moved to the open position, and to automatically allow movement of the door 52 toward the closed position once force that exceed the pre-determined holding force has been applied to the door 52. The passive holding mechanism 70 may comprise any suitable device or design which provides resistance to movement of the door 52 from the open position toward the closed position. For example, the passive holding mechanism 70 may be a detent which engages features of the door 52 such that sufficient force must be applied to the door 52 to disengage such features from the detent, or the passive holding mechanism 70 may be frictional engagement between stationary features of the vehicle 10 and moving features of the door 52, such that sufficient force must be applied to the door 52 to overcome frictional resistance to movement of the door 52 from the open position toward the closed position. It should be understood that any suitable design or method of holding the door 52 at the open position such that a controllable pre-determined force must be applied to the door 52 to initiate movement of the door 52 from the open position may be utilized without departing from the novel features of the present disclosure.

When the door 52 is being passively held in the open position by a passive holding mechanism 70, the system controller 36 detects initiation of closing of the door 52 by monitoring acceleration of the door 52 with the accelerometer 54 and monitoring the position of the door 52 with the hall sensor 56. The system controller 36 determines that closing of the door 52 has been initiated based on feedback from the accelerometer 54 and the hall sensor 56 that the pre-determined holding force has been overcome and the door 52 has moved from the open position toward the closed position.

In another exemplary embodiment, the door 52 of the vehicle 10 is actively maintained in the open position at the pre-determined holding force by the braking mechanism 62 that is adapted to impede movement of the door 52. Actively holding the door 52 in the open position comprises actuating the braking mechanism 62 once the door 52 is moved to the open position, and maintaining actuation of the braking mechanism 62 until force is applied to the door 52 that exceeds the pre-determined holding force.

When the door 52 is being actively held in the open position by the braking mechanism 62, the system controller 36 detects initiation of closing for the door 52 by monitoring forces applied to the door 52 with the torque sensor 58, and when an operator tries to move the door 52 from the open position toward the closed position with force that exceeds the pre-determined holding force, the system controller 36 deactivates the braking mechanism 62, thus releasing the door 52 and allowing the door 52 to move from the open position toward the closed position.

Once the system controller 36 detects initiation of closing of the door 52, either by an operator applying sufficient force to overcome the pre-determined holding force of the passive holding mechanism 70 or by an operator applying force that exceeds the pre-determined holding force and triggering deactivation of the braking mechanism 58, the system controller 36 then maintains a powered closing speed of the door 52 from the open position to a pinch point 72.

In an exemplary embodiment, when maintaining a powered closing speed of the door 52 from the open position to the pinch point 72, the system controller 36 calculates a closing speed based on feedback from the accelerometer 54 and the hall sensor 56. Thus, the system controller 36 receives information related to how fast an operator is moving the door 52 when closing of the door 52 is initiated and calculates a speed at which the operator intends to move the door 52 from the open position toward the closing position. Using acceleration data from the accelerometer 54, the system controller 36 calculates/approximates the closing speed based on acceleration/inertia. In an exemplary embodiment, along with acceleration data from the accelerometer 54 and position data from the hall sensor 56, the system controller 36 uses data collected by the torque sensor 58 to determine that closing of the door 52 has been initiated and to calculate the closing speed. The torque sensor 58 provides more accurate data and provides the data faster than the accelerometer 54 and hall sensor 56, thus reducing latency and improving response time and overall performance of the system 50. The system controller 36 then actuates the motor 60 to move the door 52 from the open position to the closed position at the calculated closing speed. In this way, the system controller 36 determines the intended speed at which the operator begins to move the door 52, and provides powered movement of the door 52 with the motor 60 at the calculated closing speed, mirroring the operators intent.

Throughout movement of the door 52 from the open position to the pinch point, the system controller 36 continuously receives data from the accelerometer 54 and the hall sensor 56 to identify if the operator applies force to accelerate or slow the movement of the door 52. If the system controller 36 sees that the operator is pulling on the door harder in an attempt to close the door faster, or is pushing back in an attempt to slow the door 52, the system controller 36 re-calculates and updates the closing speed such that the motor 60 continues to move the door 52 at a speed mirroring the operator's intent.

Throughout movement of the door 52 from the open position to the pinch point, the system controller 36 continuously receives data from the accelerometer 54 and the hall sensor 56 to identify if movement of the door 52 toward the closed position is abruptly stopped, such as when the door 52 encounters an object in the path of movement of the door 52. When the system controller 36 determines that the door 52 has hit an obstacle, based on feedback from the accelerometer 54, the system controller 36 de-activates the motor 60 and discontinues powered closing of the door 52. At this point, the system controller 36 may wait a pre-determined time window before re-setting, wherein upon detection of initiation of closing (presumably after the obstacle has been removed), the system controller 36 will once again calculate a closing speed and actuate powered closing of the door 52.

The pinch point 72 is a position of the door just prior to the door reaching the closed position, as indicated at 72 in FIG. 1. When the door 52 reaches the pinch point 72, the system controller 36 is adapted to slow the closing speed of the door 72, and allow the door 52 to freely move to the closed position at a reduced speed, thus preventing a hard closure or "slamming" of the door 52 to the closed position.

In an exemplary embodiment, when slowing the closing speed of the door 52 when the door reaches the pinch point 72, the system controller 36 is further adapted to receive data from the hall sensor 56 to determine that the door 52 has reached the pinch point 72, and slow movement of the door 52 toward the closed position. The system controller 36 slows movement of the door 52 by at least one of 1) braking movement of the door 52 by reversing the motor (short to ground), creating a back drive effect that slows movement of the door 52 toward the closed position, and 2) braking movement of the door 52 by actuating the braking mechanism 62.

Figure 4A:
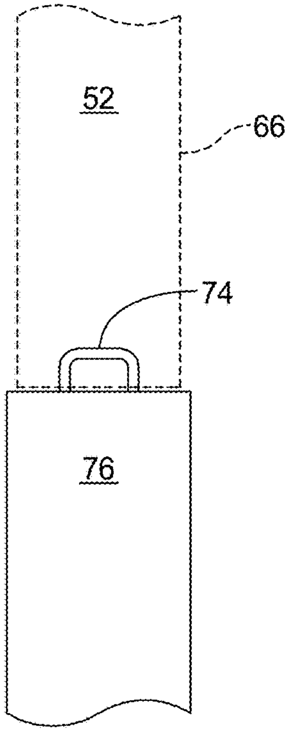
FIG. 4A is an enlarged view of a portion of FIG. 3, wherein the door is in a closed position.
Figure 4B:
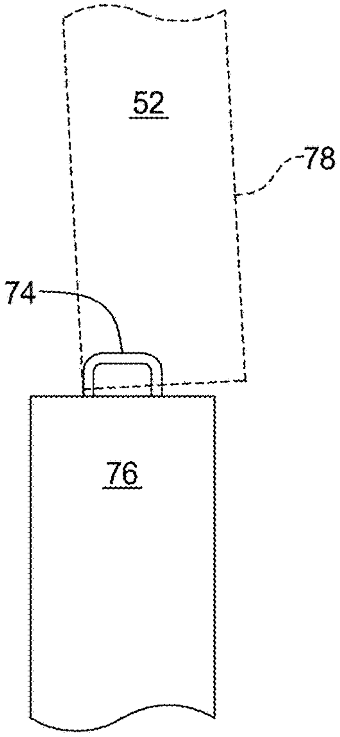
FIG. 4B is an enlarged view similar to FIG. 4A, wherein the door is in a closing position.
Figure 4C:
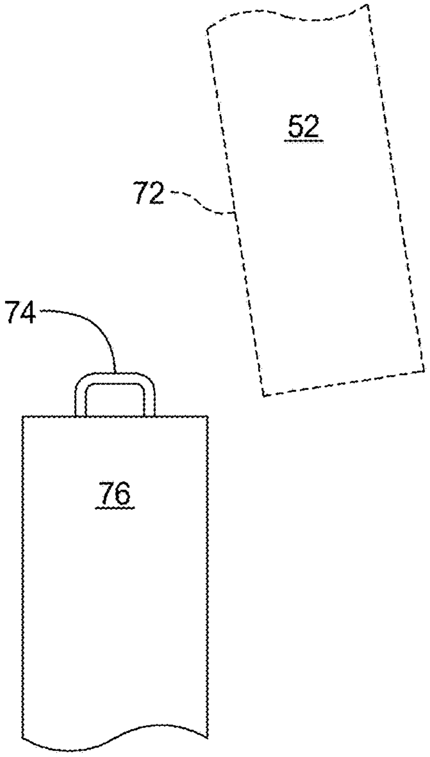
FIG. 4C is an enlarged view similar to FIG. 4A and FIG. 4B, wherein the door is positioned at a pinch point.

Referring to FIG. 4A, FIG. 4B and FIG. 4C, FIG. 4A is a schematic illustration of the door 52 in the closed position, wherein the door 52 is engaged with a latch feature 74 of a door jam 76 of the vehicle 10. FIG. 4B is a schematic illustration of the door 52 in a closing position, as indicated at 78, immediately prior to the door 52 engaging the latch feature 74, and FIG. 4C is a schematic illustration of the door 52 at the pinch point 72. As the door 52 moves toward the closed position at the calculated closing speed (mirroring the intent of the operator), beginning at the pinch point (FIG. 4C), the system controller 36 brakes movement of the door 52 to slow down movement of the door toward the closed position to provide for a soft closure.

In an exemplary embodiment, when allowing the door 52 to freely move to the closed position, the system controller 36 is further adapted to detect, via communication with the hall sensor 56, when the door 52 reaches the closing position (78, FIG. 4B), wherein, upon reaching the closing position, the system controller 36 deactivates braking of the door 52, and allows the door 52 to freely move to the closed position (66, FIG. 4A), wherein the door 52 engages the latch mechanism 74.

In another exemplary embodiment, when allowing the door 52 to freely move to the closed position, the system controller 36 is further adapted to detect, via communication with the torque sensor 58, when the force of the closing door 52 falls below a predetermined braking threshold. When the door 52, moving at the closing speed, reaches the pinch point 72, momentum will push the door 52 toward the closed position. As the system controller 36 attempts to brake movement of the door 52, countering force is applied, either by back drive of the motor 60, or braking with the braking mechanism 62, and the door 52 will begin to slow. As the door 52 slows, the momentum force of the door 52 will diminish, and less force will be required to further slow the door 52. When the force of the door 52 moving toward the closed position is reduced below a pre-determined braking threshold, as measured by the torque sensor 58, thus indicating that the movement of the door 52 has been slowed, the system controller 36 discontinues braking of the door 52 and allows the door 52 to freely move to the closed position (66, FIG. 4A), wherein the door 52 engages the latching mechanism 74 to secure the door 52 in the closed position.

Figure 5:
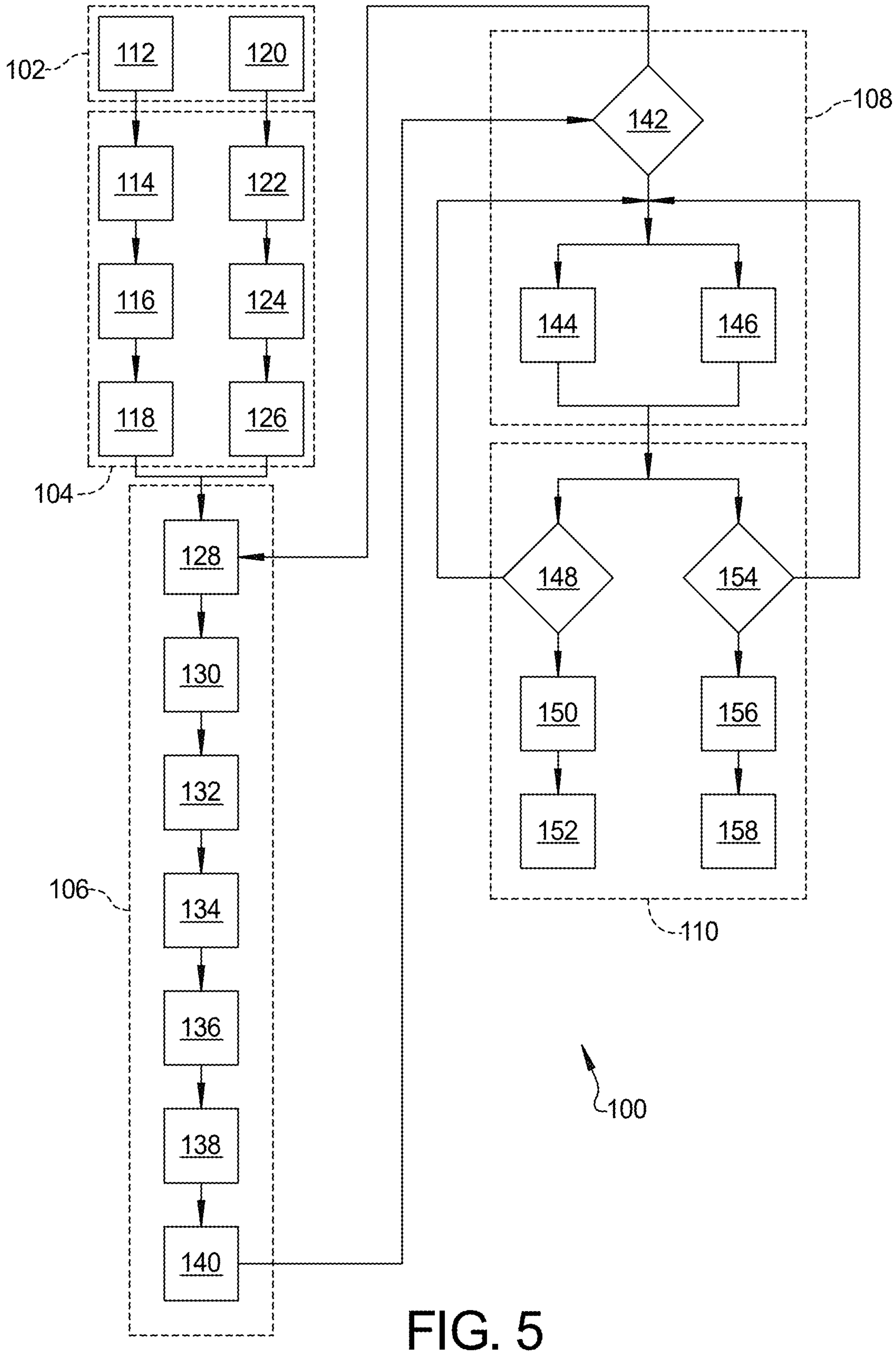
FIG. 5 is a flow chart illustrating a method of using the powered door system according to an exemplary embodiment.

Referring to FIG. 5, a method 100 of controlling a powered door 52 closing in a vehicle 10, includes, beginning at block 102, maintaining a door 52 of a vehicle 10 in an open position, moving to block 104, detecting, with a system controller 36, initiation of closing of the door 52 by an operator, moving to block 106, maintaining, with the controller 36, a powered closing speed of the door 52 from the open position to a pinch point 72, moving to block 108, slowing the closing speed of the door 52 when the door 52 reaches the pinch point 72, and, moving to block 110, allowing the door 52 to freely move to a closed position.

In an exemplary embodiment, the maintaining the door 52 of the vehicle 10 in the open position at block 102 further includes, moving to block 112, passively holding the door 52 in the open position at a pre-determined holding force with a passive holding mechanism 70, and the detecting, with the system controller 36, initiation of closing of the door 52 by an operator at block 104 further includes, moving to block 114, monitoring, with the system controller 36 via communication with an accelerometer 54, an acceleration of the door 54, moving to block 116, monitoring, with the system controller 36 via communication with a hall sensor 56, a position of the door 52, and, moving to block 118, determining, with the system controller 36, that closing of the door 52 has been initiated based on feedback, received by the system controller 36 from the accelerometer 54 and the hall sensor 56, that the pre-determined holding force has been overcome and the door 52 has moved from the open position.

In another exemplary embodiment, the maintaining the door 52 of the vehicle 10 in the open position at block 102, further includes, moving to block 120, actively holding the door 52 in the open position at a pre-determined holding force with a braking mechanism 62 adapted to impede movement of the door 52, and the detecting, with the system controller 36, initiation of closing of the door 52 by an operator at block 104 further includes, moving to block 122, monitoring, with the system controller 36 via communication with a torque sensor 58, a force applied by an operator to move the door 52 from the open position toward the closed position, moving to block 124, determining, with the system controller 36, that closing of the door 52 has been initiated based on feedback, received by the system controller 36 from the torque sensor 58, that the pre-determined holding force has been overcome, and, moving to block 126, deactivating the braking mechanism 62.

In an exemplary embodiment, the maintaining, with the system controller 36, a powered closing speed of the door 52 from the open position to a pinch point 72 at block 106, further includes, moving to block 128, monitoring, with the system controller 36 via communication with the accelerometer 54, an acceleration of the door 52, moving to block 130, monitoring, with the system controller 36 via communication with the hall sensor 56, a position of the door 52, moving to block 132, calculating, based on feedback from the accelerometer 54 and the hall sensor 56 a closing speed at which the operator is moving the door 52 from the open position toward the closed position, moving to block 134, actuating, with the system controller 36, a motor 60 adapted to move the door 52 from the open position to the closed position, and, moving to block 136, moving, with the motor 60, the door 52 from the open position to the closed position at the calculated closing speed.

In another exemplary embodiment, the maintaining, with the system controller 36, a powered closing speed of the door 52 from the open position to the pinch point 72 at block 106 further includes, moving to block 138, continuously updating the calculated closing speed throughout movement of the door 52 from the open position to the closed position, and, moving to block 140, stopping, with the system controller 36, powered movement of the door 52 with the motor 60 when the system controller 36, via feedback from the accelerometer 54, detects that the door 52 has hit an obstacle between the open position and the closed position.

In an exemplary embodiment, the slowing the closing speed of the door 52 when the door 52 reaches the pinch point 72 at block 108 further includes, moving to block 142, determining, with the system controller 36, based on feedback from the hall sensor 56, when the door 52 reaches the pinch point 72, wherein, if, at block 142, the system controller 36 determines that the door 52 has not reached the pinch point 72, the method 100 reverts back to block 128, and, if at block 142, the system controller 36 determines that the door 52 has reached the pinch point 72, the system controller 36 initiates at least one of, moving to block 144, braking movement of the door 52 by reversing, with the system controller 36, the motor 60, and, moving to block 146, braking movement of the door 52 by actuating, with the system controller 36, a braking mechanism 62 adapted to impede movement of the door 52.

In another exemplary embodiment, the allowing the door 52 to freely move to a closed position at block 110 further includes, moving to block 148, detecting, with the system controller 36 via communication with the hall sensor 56, when the door 52 reaches a closing position 78, wherein, if the system controller 36 determines that the door 52 has not reached the closing position 78, the method 100 reverts back to blocks 144 and 146 wherein braking of movement of the door 52 is continued, and, if the system controller 36 determines that the door 52 has reached the closing position 78, then, moving to block 150, the method 100 includes deactivating the braking, and, moving to block 152, allowing the door 52 to freely move to the closed position 66.

Alternatively, in another exemplary embodiment, the allowing the door 52 to freely move to a closed position at block 110 further includes, moving to block 154 detecting, with the system controller 36 via communication with the torque sensor 58, when the force of the closing door 52 falls below a predetermined braking threshold, and, if the force of the closing door 52 has not fallen below the predetermined braking threshold, the method 100 reverts back to blocks 144 and 146 wherein braking of movement of the door 52 is continued, and, if the force of the closing door 52 has fallen below the predetermined braking threshold the method 100 includes, moving to block 156, discontinuing braking of the door 52, and, moving to block 158, allowing the door 52 to freely move to the closed position 66.

A system and method of the present disclosure offers several advantages. These include providing powered closing of a vehicle door wherein the powered vehicle door mirrors the intentions of an operator regarding speed and force of closing the door, and provides interruption of the powered closing when the door approaches a closed position to provide for a soft closing of the powered vehicle door.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of controlling a powered door closing in a vehicle, comprising:
- maintaining a door of a vehicle in an open position;
- detecting, with a controller, initiation of closing of the door by an operator;
- maintaining, with the controller, a powered closing speed of the door from the open position to a pinch point, including:
  - monitoring, with the controller via communication with an accelerometer, an acceleration of the door;
  - monitoring, with the controller via communication with a hall sensor, a position of the door;
  - calculating, based on feedback from the accelerometer and the hall sensor a closing speed at which the operator is moving the door from the open position toward the closed position;
  - actuating, with the controller, a motor adapted to move the door from the open position to the closed position;
  - moving, with the motor, the door from the open position to the closed position at the calculated closing speed;
  - continuously updating the calculated closing speed throughout movement of the door from the open position to the closed position; and
  - stopping, with the controller, powered movement of the door with the motor when the controller, via feedback from the accelerometer, detects that the door has hit an obstacle between the open position and the pinch point;
- slowing the closing speed of the door when the door reaches the pinch point; and
- allowing the door to freely move to a closed position.

2. The method of claim 1, wherein the maintaining the door of the vehicle in the open position further includes passively holding the door in the open position at a pre-determined holding force with a passive holding mechanism; and
- the detecting, with the controller, initiation of closing of the door by an operator further includes:
  - monitoring, with the controller via communication with an accelerometer, an acceleration of the door;
  - monitoring, with the controller via communication with a hall sensor, a position of the door; and
  - determining, with the controller, that closing of the door has been initiated based on feedback, received by the controller from the accelerometer and the hall sensor, that the pre-determined holding force has been overcome and the door has moved from the open position.

3. The method of claim 2, wherein the slowing the closing speed of the door when the door reaches the pinch point further includes determining, with the controller, based on feedback from the hall sensor, when the door reaches the pinch point, and
- braking movement of the door by reversing, with the controller, the motor.

4. The method of claim 2, wherein the allowing the door to freely move to a closed position further includes:
- detecting, with the controller via communication with the hall sensor, when the door reaches a closing position; and
- when the door reaches the closing position, deactivating the braking and allowing the door to freely move to the closed position.

5. The method of claim 2, wherein the slowing the closing speed of the door when the door reaches the pinch point further includes determining, with the controller, based on feedback from the hall sensor, when the door reaches the pinch point, and braking movement of the door by actuating, with the controller, a braking mechanism adapted to impede movement of the door.

6. The method of claim 1, wherein the maintaining the door of the vehicle in the open position further includes actively holding the door in the open position at a pre-determined holding force with a braking mechanism adapted to impede movement of the door; and
- the detecting, with the controller, initiation of closing of the door by an operator further includes:
  - monitoring, with the controller via communication with a torque sensor, a force applied by an operator to move the door from the open position toward the closed position;
  - determining, with the controller, that closing of the door has been initiated based on feedback, received by the controller from the torque sensor, that the pre-determined holding force has been overcome; and
  - deactivating the braking mechanism.

7. The method of claim 6, wherein the slowing the closing speed of the door when the door reaches the pinch point further includes determining, with the controller, based on feedback from the hall sensor, when the door reaches the pinch point, and
- braking movement of the door by reversing, with the controller, the motor.

8. The method of claim 6, wherein the allowing the door to freely move to a closed position further includes:
- detecting, with the controller via communication with the load sensor, when the force of the closing door falls below a predetermined braking threshold; and
- when the force of the closing door falls below the pre-determined braking threshold, discontinuing braking of the door and allowing the door to freely move to the closed position.

9. The method of claim 6, wherein the slowing the closing speed of the door when the door reaches the pinch point further includes determining, with the controller, based on feedback from the hall sensor, when the door reaches the pinch point, and braking movement of the door by actuating, with the controller, the braking mechanism.

10. A powered door system for a vehicle, comprising:
- a controller that is adapted to detect when an operator initiates closing of a door that is being maintained in an open position;
- a motor in communication with the controller and adapted to move the door from the open position to a closed position;
- the controller further adapted to, upon detection that an operator has initiated closing of the door:

maintain a powered closing speed of the door from the open position to a pinch point, wherein the controller is further configured to:

calculate, based on feedback from an accelerometer and a hall sensor in communication with the controller, a closing speed at which the operator is moving the door from the open position toward the closed position;

actuate the motor to move the door from the open position to the closed position;

move, with the motor, the door from the open position to the closed position at the calculated closing speed;

continuously update the calculated closing speed throughout movement of the door from the open position to the pinch point; and stop powered movement of the door with the motor when the controller, via feedback from the accelerometer, detects that the door has hit an obstacle between the open position and the pinch point;

slow the closing speed of the door when the door reaches the pinch point; and allow the door to freely move to a closed position.

11. The system of claim 10, wherein the door of the vehicle is passively maintained in the open position at a pre-determined holding force with a passive holding mechanism.

12. The system of claim 11, wherein when detecting when an operator initiates closing of the door, the controller is further adapted to:

monitor acceleration of the door with the accelerometer;

monitor a position of the door with the hall sensor; and determine that closing of the door has been initiated based on feedback from the accelerometer and the hall sensor that the pre-determined holding force has been overcome and the door has moved from the open position.

13. The system of claim 10, wherein when slowing the closing speed of the door when the door reaches the pinch point, the controller is further adapted to determine, based on feedback from the hall sensor, when the door reaches the pinch point, and brake movement of the door by reversing the motor.

14. The system of claim 10, wherein when allowing the door to freely move to the closed position the controller is further adapted to:

detect, via communication with the hall sensor, when the door reaches a closing position; and when the door reaches the closing position, deactivate the braking of the door and allow the door to freely move to the closed position.

15. The system of claim 10, wherein when slowing the closing speed of the door when the door reaches the pinch point, the controller is further adapted to determine, based on feedback from the hall sensor, when the door reaches the pinch point, and brake movement of the door by actuating the braking mechanism.

16. The system of claim 10, wherein the door of the vehicle is actively maintained in the open position at a pre-determined holding force by a braking mechanism adapted to impede movement of the door; and when detecting initiation of closing of the door by an operator the controller is further adapted to:

monitor, via communication with a torque sensor, a force applied by an operator to move the door from the open position toward the closed position;

determine that closing of the door has been initiated based on feedback, from the torque sensor, that the pre-determined holding force has been overcome; and deactivating the braking mechanism.

17. The system of claim 16, wherein:

when slowing the closing speed of the door when the door reaches the pinch point the controller is further adapted to determine, based on feedback from the hall sensor, when the door reaches the pinch point, and brake movement of the door by reversing the motor.

18. The system of claim 16, wherein when slowing the closing speed of the door when the door reaches the pinch point the controller is further adapted to determine, based on feedback from the hall sensor, when the door reaches the pinch point, and brake movement of the door by actuating a brake adapted to impede movement of the door.

19. The system of claim 16, wherein when allowing the door to freely move to the closed position, the controller is further adapted to detect, via communication with the load sensor, when the force of the closing door falls below a predetermined braking threshold, and, when the force of the closing door falls below the predetermined braking threshold, discontinue braking of the door and allow the door to freely move to the closed position.

20. A vehicle including a powered door system, the powered door system comprising:

a controller that is adapted to one of:

detect when an operator initiates closing of a door that is being maintained in an open position by:

monitoring acceleration of the door with an accelerometer;

monitoring a position of the door with a hall sensor; and determining that closing of the door has been initiated based on feedback from the accelerometer and the hall sensor that a pre-determined holding force of a passive holding mechanism has been overcome and the door has moved from the open position; or detect when an operator initiates closing of a door that is being maintained in an open position by:

monitoring, via communication with a torque sensor, a force applied by an operator to move the door from the open position toward the closed position;

determining that closing of the door has been initiated based on feedback, from the torque sensor, that a pre-determined holding force has been overcome; and deactivating a braking mechanism adapted to actively hold the door in the open position;

a motor in communication with the controller and adapted to move the door from the open position to a closed position;

the controller further adapted to, upon detection that an operator has initiated closing of the door:

calculate, based on feedback from the accelerometer and the hall sensor, a closing speed at which the operator is moving the door from the open position toward the closed position;

actuate the motor to move the door from the open position to the closed position;

move, with the motor, the door from the open position to the closed position at the calculated closing speed;

continuously update the calculated closing speed throughout movement of the door from the open position to the closed position;

stop powered movement of the door with the motor when the controller, via feedback from the accelerometer, detects that the door has hit an obstacle between the open position and the closed position;

slow the closing speed of the door when the door reaches a pinch point; and determine, based on feedback from the hall sensor, when the door reaches a pinch point; and at least one of:

brake movement of the door to slow the closing speed of the door by reversing the motor; and brake movement of the door to slow the closing speed of the door by actuating a braking mechanism;

detect, via communication with the hall sensor, when the door reaches a closing position; and when the door reaches the closing position, deactivate the braking of the door and allow the door to freely move to a closed position.

* * * * *